US007076762B2

(12) United States Patent
Fisher

(10) Patent No.: US 7,076,762 B2
(45) Date of Patent: Jul. 11, 2006

(54) DESIGN AND REDESIGN OF ENTERPRISE APPLICATIONS

(75) Inventor: Marina Fisher, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 632 days.

(21) Appl. No.: 10/113,134

(22) Filed: Mar. 29, 2002

(65) Prior Publication Data

US 2003/0188291 A1    Oct. 2, 2003

Related U.S. Application Data

(60) Provisional application No. 60/366,841, filed on Mar. 22, 2002.

(51) Int. Cl.
*G06F 9/44* (2006.01)

(52) U.S. Cl. .................. 717/102; 717/102; 717/103; 717/107

(58) Field of Classification Search ........ 717/102–104, 717/108, 168, 177, 107; 705/1; 707/63; 709/316

See application file for complete search history.

(56) References Cited

U.S. PATENT DOCUMENTS

| | | | | |
|---|---|---|---|---|
| 5,860,005 A | * | 1/1999 | Inoue | 717/101 |
| 5,953,525 A | * | 9/1999 | Glaser et al. | 717/105 |
| 6,018,627 A | * | 1/2000 | Iyengar et al. | 717/103 |
| 6,058,264 A | * | 5/2000 | Glaser | 717/101 |
| 6,427,230 B1 | * | 7/2002 | Goiffon et al. | 717/108 |
| 6,684,383 B1 | * | 1/2004 | Natori et al. | 717/107 |
| 6,874,146 B1 | * | 3/2005 | Iyengar | 719/313 |
| 6,968,535 B1 | * | 11/2005 | Stelting et al. | 717/104 |
| 2002/0069081 A1 | * | 6/2002 | Ingram et al. | 705/1 |
| 2002/0073396 A1 | * | 6/2002 | Crupi et al. | 717/104 |
| 2002/0091989 A1 | * | 7/2002 | Cole et al. | 717/102 |
| 2002/0170048 A1 | * | 11/2002 | Zgarba et al. | 717/168 |
| 2003/0004937 A1 | * | 1/2003 | Salmenkaita et al. | 707/3 |
| 2003/0046282 A1 | * | 3/2003 | Carlson et al. | 707/6 |
| 2003/0051066 A1 | * | 3/2003 | Pace et al. | 709/316 |
| 2003/0051236 A1 | * | 3/2003 | Pace et al. | 717/177 |
| 2004/0083453 A1 | * | 4/2004 | Knight et al. | 717/113 |

OTHER PUBLICATIONS

Pour, Enterprise JavaBeans, JavaBeans and XML expanding the possibilities for Web-based enterprise application development, IEEE, Sep. 22-25, 1999, pp.: 282-291.*

(Continued)

*Primary Examiner*—Wei Zhen
*Assistant Examiner*—Satish S. Rampuria
(74) *Attorney, Agent, or Firm*—Robert C. Kowert; Meyertons, Hood, Kivlin, Kowert & Goetzel, P.C.

(57) ABSTRACT

An enterprise application may be constructed or reconstructed according to a system and method for designing or redesigning enterprise applications. The design or redesign process may include identification of the application type, in addition to representation of the application type as a decomposition of software components. The design or redesign may focus on reviewing code level component design and utilization. The code level design or redesign may include an analysis of each component within each use case within each tier based on patterns, frameworks, and/or refactoring. The application design or redesign may yield recommendations for code creation or code improvements. The recommendations may include specific application enhancements. The recommendations may include specific code design to be incorporated during construction or reconstruction. The recommendations may include results for guiding the design or redesign phase for an application.

51 Claims, 13 Drawing Sheets

OTHER PUBLICATIONS

Kitayama et al., Design of a framework for dynamic content adaptation to Web-enabled terminals and enterprise applications, IEEE, Dec. 7-10, 1999, pp.: 72-79.*
Zarli et al., Integrating STEP and CORBA for applications interoperability in the future virtual enterprises computer-based infrastructures, IEEE, Intelligent Information Systems, 1997. IIS '97. Proceeding,s Dec. 8-10, 1997, pp.: 309-315.*
Andreoli et al., CLF/Mekano: a framework for building virtual-enterprise applications, IEEE, Sep. 27-30, 1999, pp: 183-192.*
Schmidt, Using Design Patterns to Develop Reusable Object-Oriented Communication Software, ACM, Oct. 1995, vol. 38, pp.: 65-74.*
Mielke, Applications for enterprise simulation, IEEE, pp.: 1490-1495 vol.2.*
Karakaxas et al., A business object oriented layered enterprise architecture, IEEE, 2000, pp.: 807-810.*
de Farias et al., A component-based groupware development methodology, IEEE, 2000, pp.: 204-213.*
Nakamur et al., Towards the integration of Web services security on enterprise environments, IEEE, 2002, pp.: 166-175.*
Jian-Wei Wang et al., Constructing an EJB application in a WFMS, IEEE, 2002, pp.: 284-286.*
Aleksandra Tesanovic, "What is a Pattern?" Real-Time Systems Laboratory, Department of Computer and Information Science, Sep. 2001, (19 Pages).
David Geary, "Amaze your Developer Friends with Design Patterns," http://www.javaworld.com/javaworld/jw-10-2001/jw-1012-designpatterns_ p.html, Oct. 12, 2001. (11 Pages).
Philippe Kruchten, "What is the Rational Unified Process?" http://www.therationaledge.com/content/jan_01/f_rup_pk.html, 2001, (11 Pages).
Adam Shostack, "Code Review in the Real World," A Black Hat Briefing, Jul. 1997, (20 Pages).
"Suntone Architecture Methodology A 3-Dimensional Approach to Architectural Design," Sun Microsystems, 2001. (39 Pages).
Donald Bradley Roberts, "Practical Analysis for Refactoring," Thesis, 1999, (137 Pages).
"OMG Unified Modeling Language Specification," Version 1.4, Sep. 2001, (56 Pages).
"Model View Controller," downloaded from http://www.object-arts.com/EducationCentre/Overviews/MVC.htm on Jan. 15, 2002, 3 pages.
"2 The Model-View-Controller Architecture," downloaded from http://rd13doc.cern.ch/Atlas/Notes/004/Note004-7.html on Jan. 15, 2002, ATD—Aug. 30, 1996, 3 pages.
Model-View-Controller Architecture, Copyright 2001 Sun Microsystems, 3 pages.
"Enterprise JavaBeans 2.0 Container-Managed Persistence Example," Beth Stearns, Sun Microsystems, Inc. Jul. 2001, 14 pages.

* cited by examiner

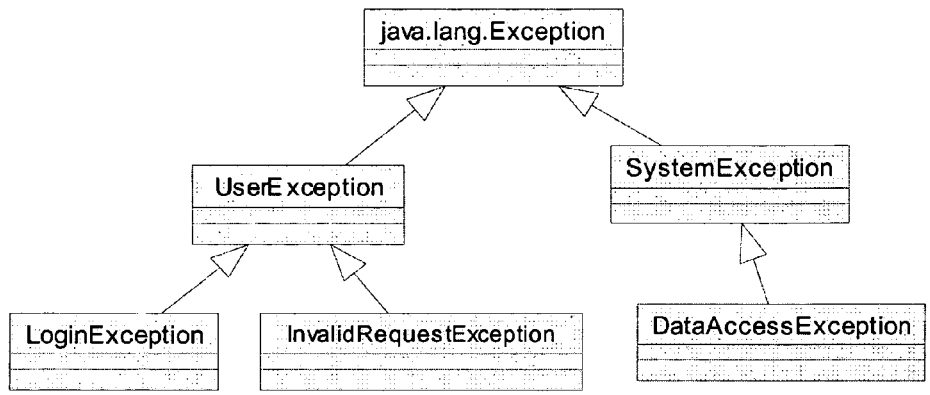

Figure 8A

```
public class DataAccessException extends MyAppException { private static Logger logger =
Logger.getLogger("com.mycompany.myapp.logger");
private static FileHandler fh = new FileHandler("dataAccessLog.txt");

public DataAccessException( Exception ex, String msg) {
                // log the error into the file
        logger.log(Level.SEVERE, msg, ex);

// send page notification to the database admin
        }
}
```

Figure 8B

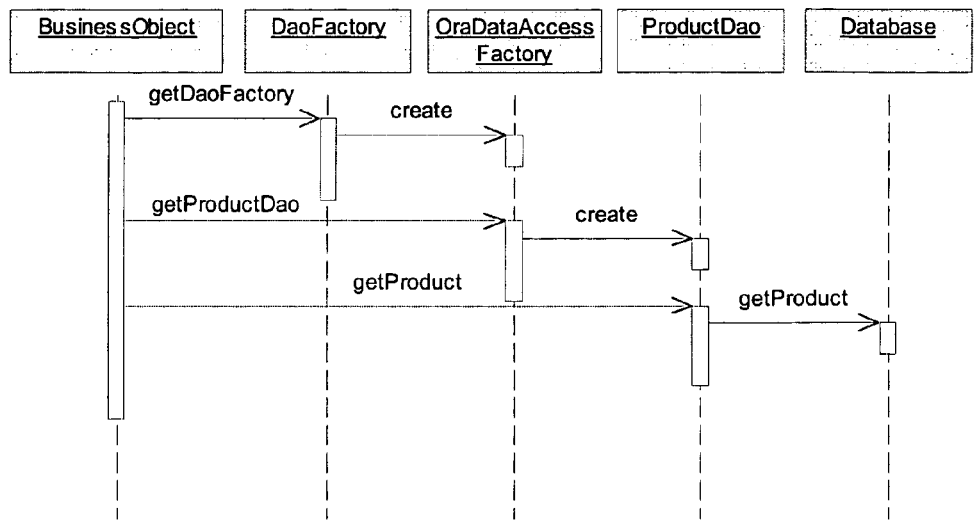

Figure 9A

```
public interface ProductDAO {
        // Specify data access object behavior
    public Product getProduct(...);
    public bolean updateProduct(...);
    public int insertProduct(...);
        public bolean deleteProduct(...);
        // additional methods
    }
```

Figure 9B

```
public class Product implements Serializable {
        // Declare member variables
    String name;
    String description;
    Double price;
    // remaining declaration // Define set and get methods
    public String getName(){...}
    public void setName(String name){...}
    // remaining set and get methods
    }
```

Figure 9C

```
public void processError(AppError error) {
        int errorType = error.getType();

switch ( errorType ) {
                case (ErrorType.InvalidRequest):
                {
                        // perform lengthy processing
break;
} case (ErrorType.DataError):
                {
                        // perform lengthy processing
break;
} case (ErrorType.SystemError):
                {
                        // perform lengthy processing
break;
}
// continue conditional statement
}
}
```

DESIGN AND REDESIGN OF ENTERPRISE APPLICATIONS

PRIORITY INFORMATION

This application claims benefit of priority to U.S. provisional application Ser. No. 60/366,841 entitled "Design and Redesign of Enterprise Application" filed Mar. 22, 2002, whose inventor is Marina Fisher.

BACKGROUND

1. Field of the Invention

This invention relates to software, and more particularly to a system and method for designing or redesigning enterprise applications.

2. Description of the Related Art

Enterprise application development often focuses on service delivery. For example, anytime and anywhere access to needed services with predictable availability, reliability, usability, performance, and security may be major priorities during development. The application architecture may dictate how well these services, among others, can be provided. If the architecture is faulty, or not developed using preferred design techniques across multiple scenarios, a system may be difficult to scale, secure, or rapidly change.

Enterprise applications may also rely on real-time continuous processing for mission critical needs, and not on a traditional service model with scheduled downtime and scheduled batch processing. Achieving an effective and acceptable level of service involves integrating the development of these types of service-oriented capabilities into the architecture design process. In addition to these service goals, enterprise applications may operate in distributed, heterogeneous environments. Thus, processing in a complex system environment may be partitioned across network segments, CPU clusters, and storage locations. The complexity of system environments, and thus the complexity of enterprise applications, not only impacts service goals, but may also impose constraints on rapid development. For example, maintaining redundant code might become an issue since any changes may have to be propagated across various application modules. Also, having multiple objects execute similar functionality may impact application performance and scalability.

Various approaches, methodologies, tools, and practices are available to complement and/or facilitate enterprise software architecture reviews. One model that focuses on architectural analysis is the SunTone Architecture Methodology (SunTone AM) developed by Sun Microsystems, Inc. Under the SunTone AM, design and development follows the creation of an architecture specification. The design and development is organized around functional scenarios at an architectural level, rather than components at a code level.

SunTone AM focuses on high-level architectural considerations more than code level component design and utilization. Components are typically small objects or programs that perform a specific function and are designed to easily operate with other applications or components. Development under the SunTone AM may be component-based, but focuses on reviewing components as utilized to solve problems associated with a specific business domain and how the overall architecture is affected. Thus, functional scenarios may be closely reviewed to ensure the architecture satisfies service goals.

Virtual platforms are available that provide capabilities for enterprise application development. One example virtual platform is J2EE (Java 2 Platform, Enterprise Edition) from Sun Microsystems, Inc. As a distributed computing model, the business presentation for an enterprise application in J2EE may be represented using servlets and/or Java Server Pages (JSPs), and the business logic may run in the form of distributed components such as Enterprise JavaBeans (EJBs). A business interface may be implemented using the Java Messaging Service (JMS). Thus, J2EE provides a convenient platform for enterprise application development, but does not itself address application design practices.

SUMMARY

A system and method for designing or redesigning enterprise application are described. The construction of the design or redesign may include identification of the application type, in addition to representation of the application type as a decomposition of software components. The enterprise application type may lead to the logical or physical representation of software components. Decomposition of the software components into a logical or physical representation may include tiers and layers. In one embodiment, the layers may include application and virtual layers consistent with the enterprise application technology used, or planned for use, during development.

In one embodiment, design or redesign may focus on reviewing code level component design and utilization at an application/virtual layer. The code level design or redesign may include an analysis of each component within each use case within each tier. Enterprise application patterns may surface improvements during design or redesign. Patterns may help designers to verify if the components are utilized in an optimal way. During design or redesign, common components may be factored into common modules as a framework of reusable components. A framework may incorporate shared utility components or frequently used business logic to also help improve design. Using refactoring techniques may help improve the overall application design, performance, and maintainability.

The application design or redesign may yield recommendations for code creation or code improvements. The recommendations may include specific application enhancements based on design patterns, refactoring techniques, and/or frameworks. The recommendations may include specific code design to be incorporated in an application. In one embodiment, the recommendations may include results for guiding the design or redesign phase of an application.

BRIEF DESCRIPTION OF THE DRAWINGS

FIGS. 8A and 8B illustrate application of frameworks according to one embodiment;

FIGS. 9A, 9B, and 9C illustrate application of frameworks according to one embodiment;

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Figure 1:
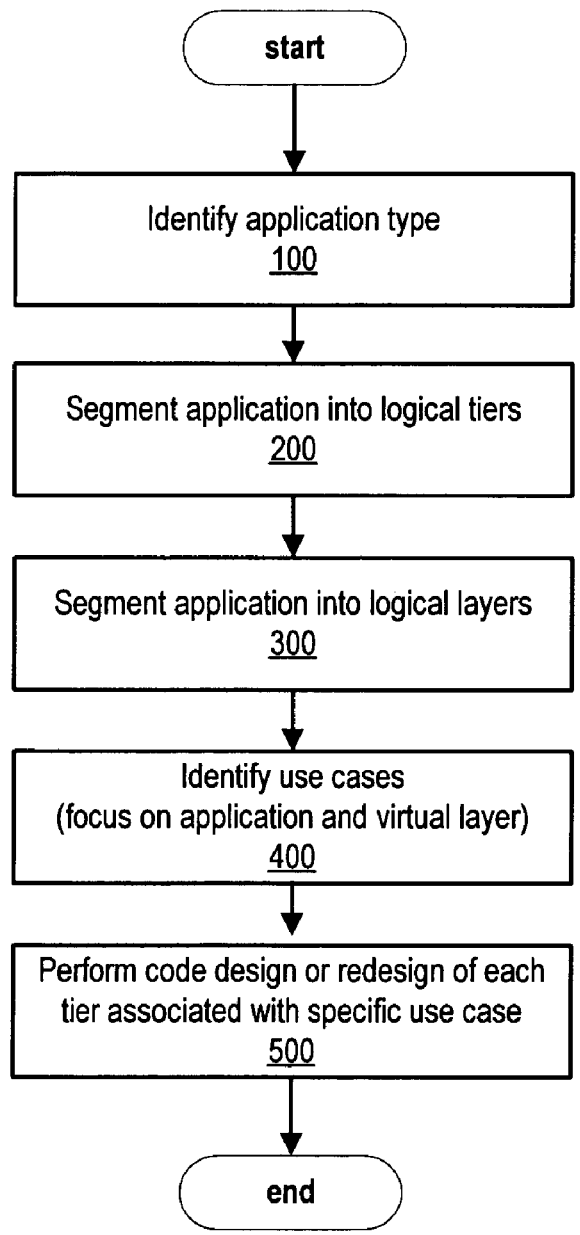
FIG. 1 illustrates a high-level enterprise application review according to one embodiment.

A system and method for design or redesign of enterprise applications is described. FIG. 1 illustrates one embodiment of a high-level application design or redesign process for enterprise applications. The design or redesign process may be used during construction of an enterprise application or reconstruction of an existing enterprise application. The process starts with identifying the application type in 100. The enterprise application type may indicate how the enterprise application components are to be partitioned across multiple logical or physical representations of the application, which may also be referred to as tiers.

Figure 2A:
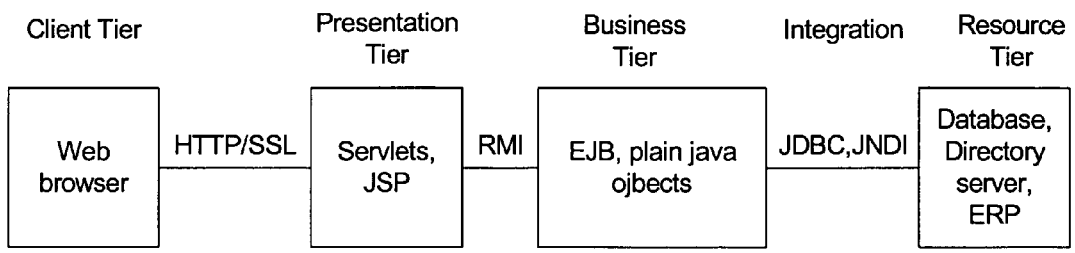
FIGS. 2A and 2B illustrate an N-tier architecture and N-tier client rich architecture according to one embodiment.
Figure 2B:
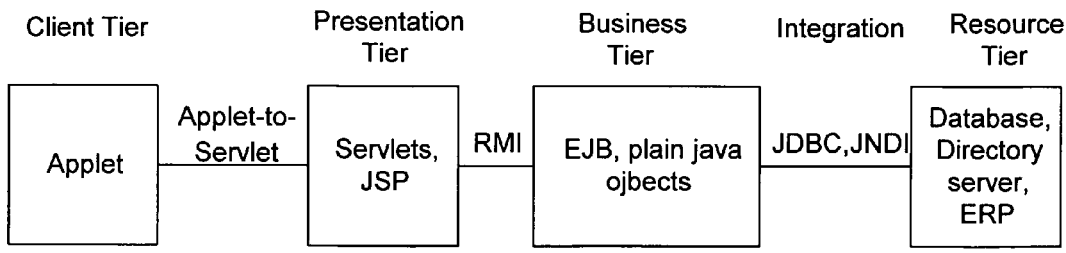

The enterprise application type may determine the partitioning of the enterprise components across multiple tiers, or some other logical or physical representation. For example, FIG. 2A illustrates an N-tier architecture. The N-tier application may include a thin Hyper Text Markup Language (HTML) based client tier, a servlet/Java Server Pages (JSP) based presentation tier, an Enterprise Java Beans (EJB) and plain java objects based business tier, a Java Database Connectivity (JDBC)/Java Naming and Database Interface (JNDI) based integration tier, and a database or another data source based resource tier. The client may communicate to the components of the presentation tier via Hyper Text Transfer Protocol (HTTP) or Secure Sockets Layer (SSL). Remote Method Invocation (RMI) may be used for communication between the presentation tier and the business tier. As another example of a tiered architecture, FIG. 2B illustrates an N-tier architecture with a rich client. Although the client typically relies on a server to perform some operation, the client may be referred to as rich, e.g., having some logic for operations as part of the client. An N-tiered model may include client logic where an applet communicates to presentation tier components such as servlets.

Figure 3A:
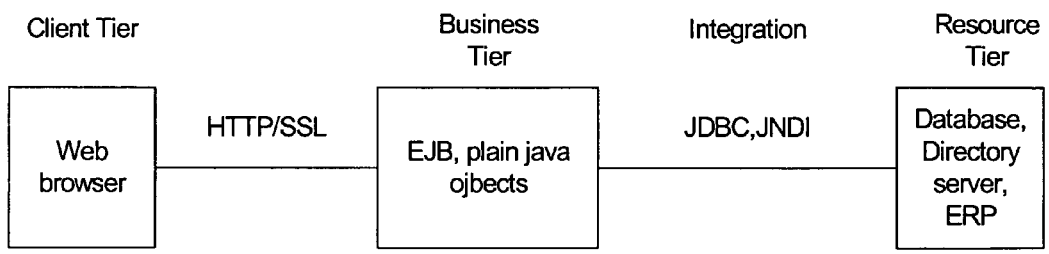
FIGS. 3A and 3B illustrate a three-tier architecture and three-tier client rich architecture according to one embodiment.
Figure 3B:
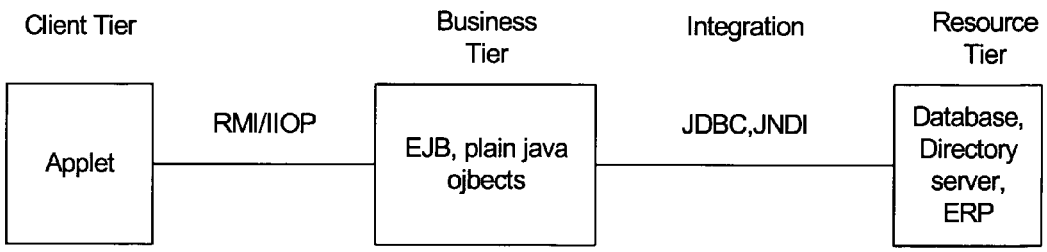

FIG. 3A illustrates an example of a three-tiered architecture. The three-tiered application may incorporate the presentation and business logic into one business logic. For example, in addition to the main business logic, business components may process user requests and apply necessary rules or transform response into the corresponding format. Alternatively, FIG. 3B illustrates a three-tiered architecture with a rich client. Thus, a three-tiered application may include an applet based client communicating to the EJB components of the business tier via RMI/Internet Inter-ORB Protocol (IIOP). In both examples of a three-tiered architecture, the enterprise application type may dictate the partitioning of the enterprise components exclude a presentation tier since the presentation logic is incorporated in the business tier.

Note the application type may determine the logical or physical representation of the components in relation to the various partitions or tiers. Thus, for application types, an integration tier may not exists separately and the resource tier may be considered thin because the data source is coupled with minimal logic. Alternatively, the integration tier may exists separately and the resource tier may be considered thick, for example, if the data source is actually an Enterprise Resource Planning (ERP) application in a distributed, heterogeneous environment. Depending on the application type, other organizations and representations of tiers are possible.

Turning again to FIG. 1, once the application type is identified, the application may be segmented into logical or physical representations such as tiers, or as deemed appropriate for the application type as in 200. In one embodiment, an application may be partitioned into tiers as described in the SunTone Architecture Methodology (SunTone AM) developed by Sun Microsystems, Inc. Depending on the application type, tiers may be the logical or physical organization of components into an ordered chain of service providers and consumers. Components within a tier typically consume the services of those in an adjacent provider tier and provide services to one or more adjacent consumer tiers. Within a tier, services are organized together according to like requirements, for example, functionality, security, or load distribution. Examples of tiers are client, presentation, business, integration, and resources. The client tier may include any device or system that manages display and local interaction processing. The presentation tier services may aggregate and personalize content and services into channel-specific user interfaces. Channel-specific interfaces may entail the assembly of content, formatting, conversions, and content transformations, or anything that has to do with the presentation of information to end users or external systems. The business tier may execute business logic and manage transactions. Examples range from low-level services such as authentication and mail transport to true line-of-business services such as order entry, customer profile, and inventory management. The integration tier services may abstract and provide access to external resources. Due to the varied and external nature of these resources, this tier may employ loosely coupled paradigms such as queuing and publish/subscribe communications. The resource tier may include resources such as legacy systems, databases, external data feeds, and specialized hardware devices such as factory automation. These resources are information sources, sinks, or stores that may be internal or external to the system.

In one embodiment, the application may be segmented into logical or physical representations such as layers as in 300. Depending on the application type, layers may include the hardware and software stack that hosts services within a given tier. Layers may be the physical, network, and software platforms and standard Application Programming Interface (API) sets that support the components which provide a service. Layers, like tiers, may represent a well-ordered relationship across interface-mediated boundaries. While tiers may represent processing chains across components, layers may represent component relationships in implementation and deployment of services. Examples of layers are application, upper, virtual, lower, and hardware layers. The application layer may include Java™ code based on components. The upper platform layer may include products such as Web servers, application servers, and various types of middleware. The virtual platform may include an application with standard APIs and specifications for the upper platform. The lower platform layer may include the operating system environment and associated low-level services. The hardware platform layer may include computing hardware such as servers, storage hardware like storage arrays, and networking hardware like switches and routers.

Figure 4:
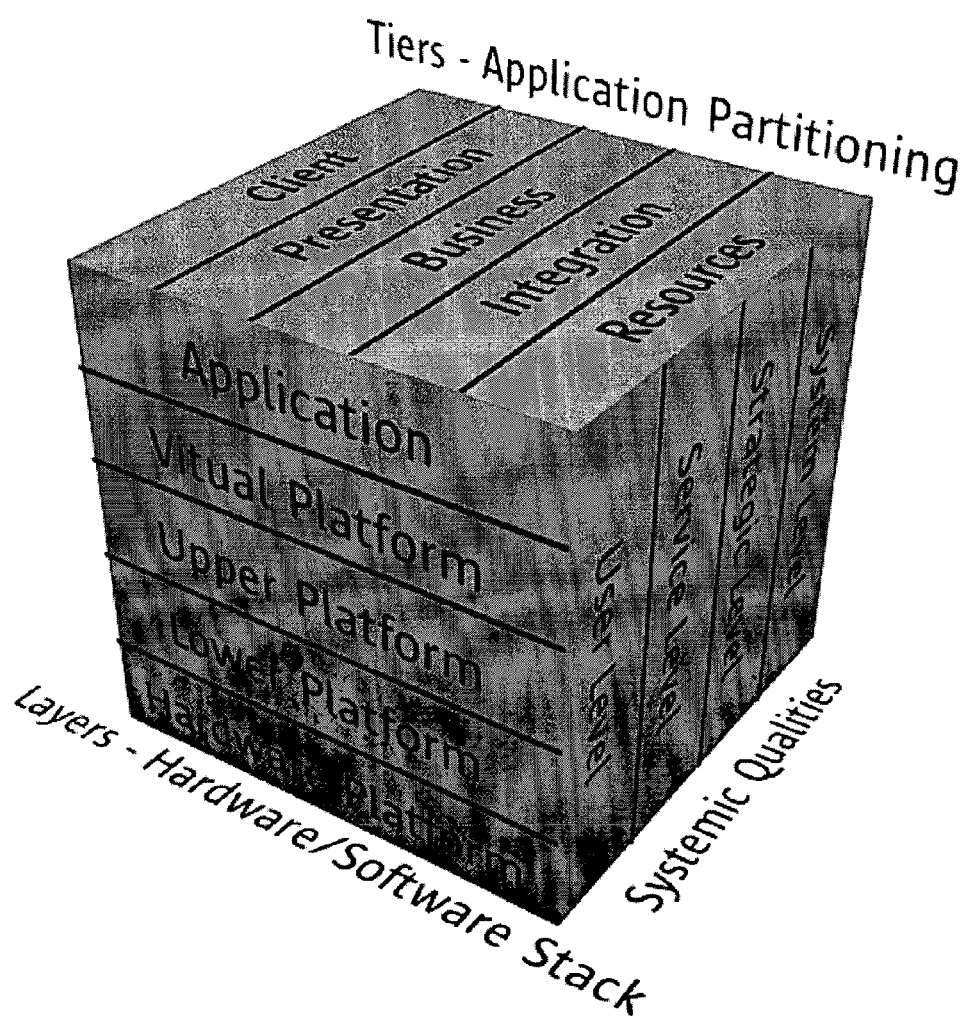
FIG. 4 is a tier and layer representation using systemic qualities according to one embodiment.

FIG. 4 illustrates one embodiment of a tier and layer representation with systemic qualities orthogonal to the tiers and layers. Systemic qualities may include the quality of services across the tiers and layers. Examples of systemic qualities are availability, scalability, security, manageability, and usability. Note the list of services is potentially infinite. One principle embodied in the graphical representation as a cube is the recognition of the orthogonal relationship that exists among tiers, layers, and systemic qualities. Systemic qualities, and therefore numerous design issues, are sometimes pervasive throughout the architecture. Systemic qualities may be applied as levels based on the category of quality. A systemic quality may fall in one or more levels.

Figure 5:
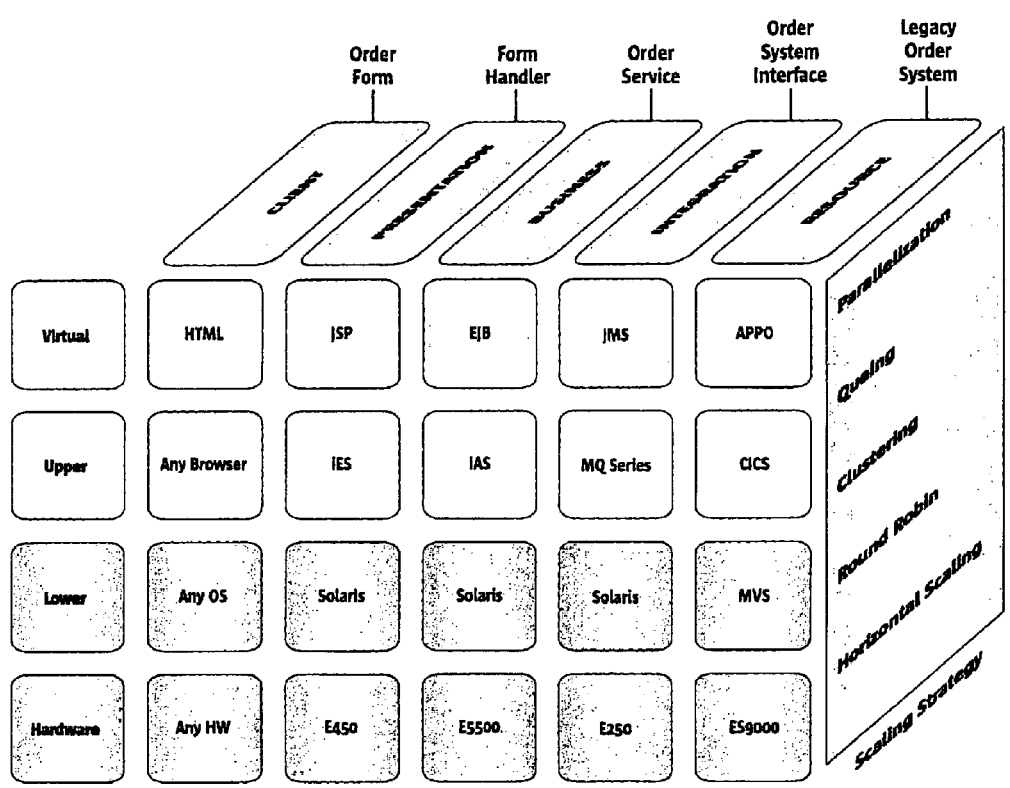
FIG. 5 illustrates examples for tiers, layers, and systemic qualities according to various embodiments.

To further illustrate examples of partitioning the enterprise components across multiple representations, FIG. 5 depicts various embodiments for tiers, layers, and systemic qualities. For example, the upper platform may include any browser for the client tier, iPlanet Enterprise Server (iES) for the presentation tier, iPlanet Application Server (iAS) for the business tier, Message Queue Series (MQ Series) for the integration tier, or Customer Information Control System (CICS) for the resource tier. The hardware may be any hardware or a server like the E450 or ES9000 from Sun Microsystems, Inc. The tiers may include client, presentation, business, integration, and resource. A systemic quality for scaling, which may include parallelization, queuing, clustering, round robin, and horizontal scaling, may be applied. Other systemic qualities such as security, availability, performance, accessibility, and usability, may also be applied.

FIGS. 2A through 5 illustrate various application types, tiers, layers, and systemic qualities. The design or redesign process illustrated in FIG. 1 may encompass many other application types and logical and/or physical representations. The application type and representations are not limited to any particular architecture. For example, a client/server architecture may lead to a representation with two tiers, three layers, and systemic qualities focused mainly on reliability and performance.

Turning again to FIG. 1, once the application type is identified, and the application is segmented into logical tiers and layers, use case scenarios at the application/virtual layer may be identified as in 400. In one embodiment, the design or redesign may focus heavily on the component relationships at the code level. Use cases are functional scenarios that describe the complete flow of an operation from the perspective of an actor. Actors may be referred to as entities which are external to the enterprise application. Examples of use cases are scenarios such as "Customer browses on-line catalog", or "Sales Representative enters order". Although various layers may be included in the logical or physical representation, use case scenarios may be identified only in the application/virtual layers. The application/virtual layers typically represent component relationships in implementation and deployment of services, and thus, relationships at the code level.

Figure 6:
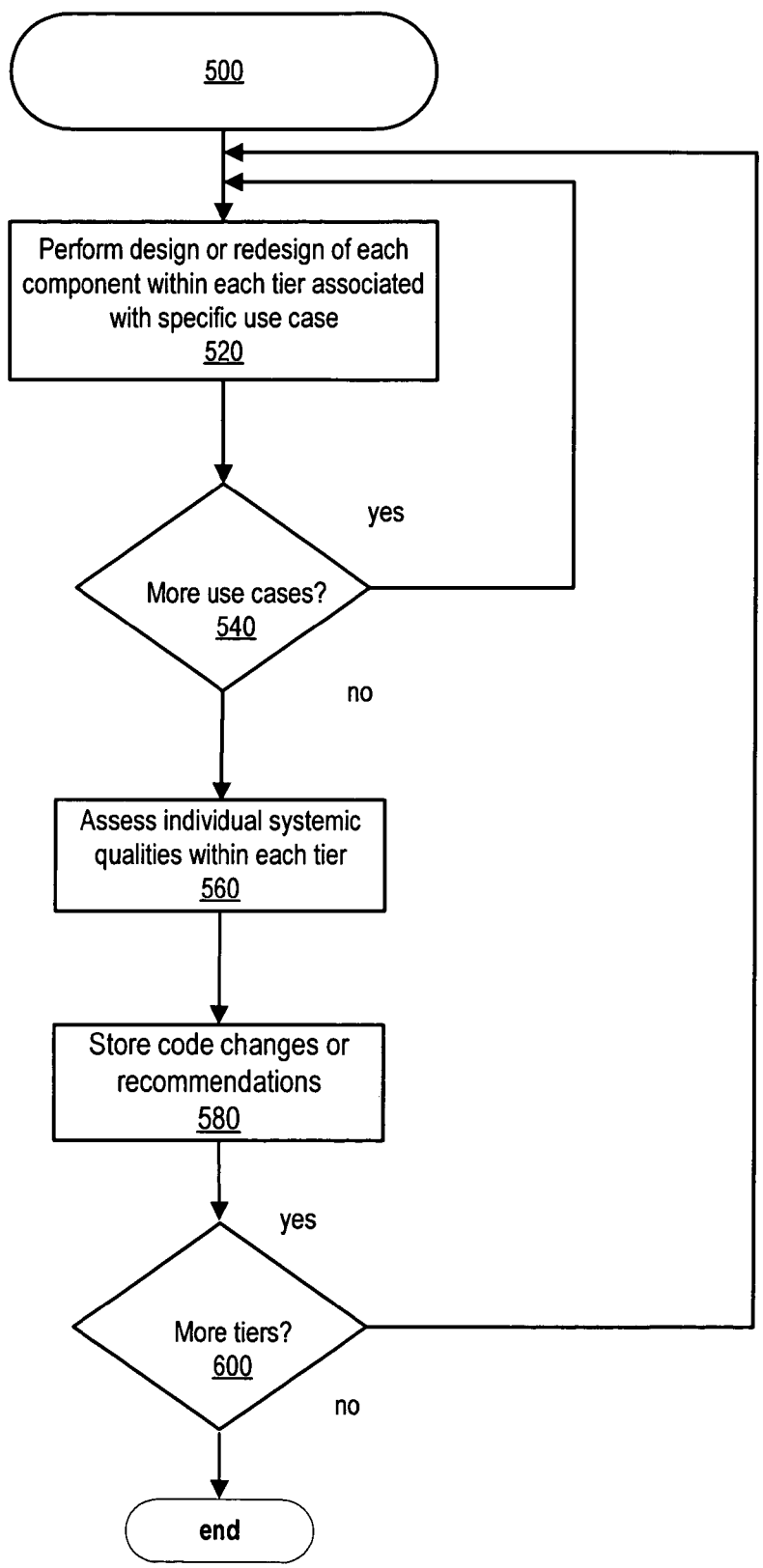
FIG. 6 illustrates a high-level enterprise application code review based on tiers according to one embodiment.
Figure 7:
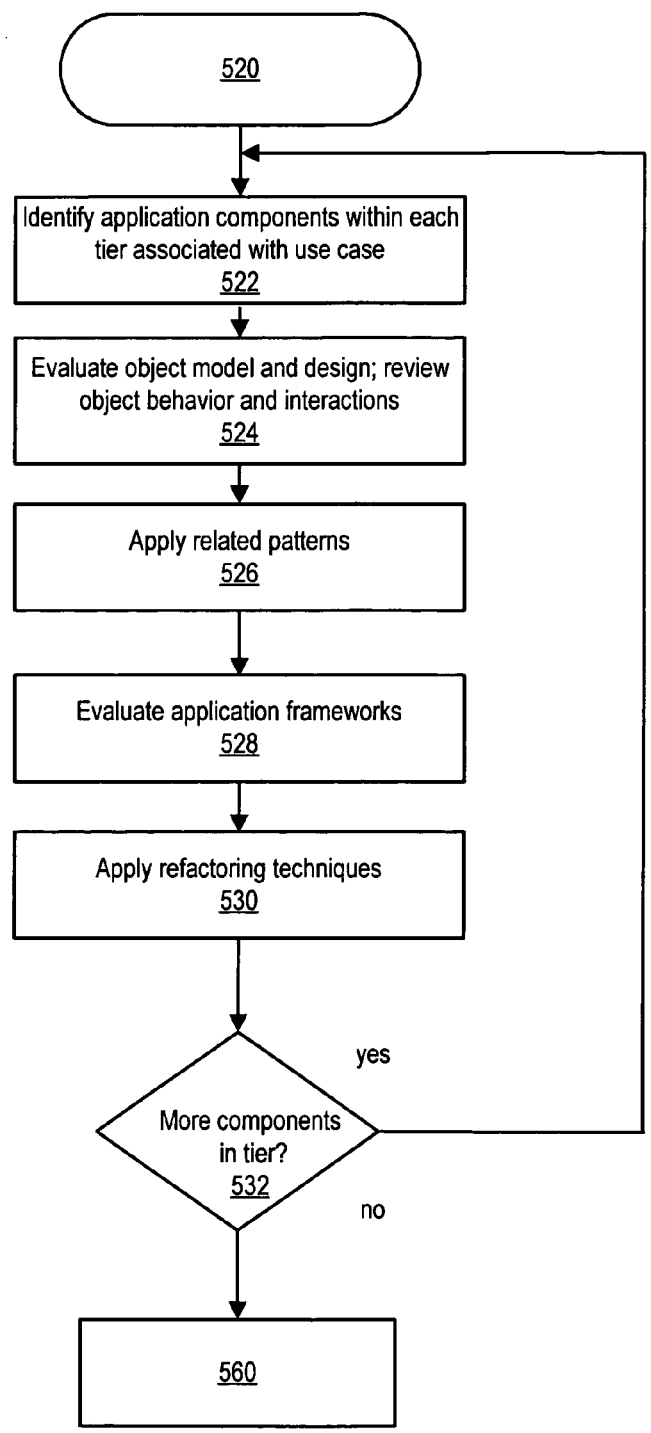
FIG. 7 illustrates a high-level enterprise application code review based on components according to one embodiment.

Once the application is segmented, and architecturally significant use case scenarios have been identified, a component-level code design or redesign of each tier associated with specific use cases is performed at the application/virtual layers in 500. For one embodiment, FIG. 6 illustrates a high-level enterprise application component-level code design or redesign at the application/virtual layers based on tiers. The design or redesign begins with an analysis of each component within each tier associated with a specific use case in 520. To further illustrate the design or redesign of each component, FIG. 7 illustrates specific design mechanisms that may be applied to each component. As part of FIG. 7, the component design or redesign begins with identifying application components within each tier in 522. While assessing individual application components, the application object model and the individual object design may be closely analyzed for coding issues in 524. During construction or reconstruction of code, the design or redesign process may surface issues with functionality incorrectly mapped to the object model or too much unrelated logic in the object design. As the implementation of the system functionality typically involves an interaction among multiple components, the design or redesign may include analysis of object interaction, the application APIs, and selected algorithms utilized by the various components. For example, the object design may satisfy requirements individually; however, once the object interacts with another object, the design may actually produce unexpected results. The cause for the unexpected results may be due to an object which inherited the wrong behavior, and thus inherited the wrong characteristics or features.

Enterprise application patterns may be applied during design or redesign in 526. Patterns convey a mechanism for solving common problems encountered in enterprise applications. Patterns may help designers to verify if the components are utilized in an optimal way. In one embodiment, the Gang of Four (GoF) design pattern catalog (*Design Patterns: Elements of Reusable Object-oriented Software* by Gamma, Helm, Johnson, and Vlissides, Addison-Wesley, 1995) may be utilized to assess the components for coding enhancements based on one or more patterns. For example, use of the Value Object, Data Access, and/or Session Facade patterns may contribute towards a decoupled application, e.g., one application module is not tightly integrated with another module. A decoupled application may enable easier application maintenance because business logic changes in one application module may not lead to changes in another application module. J2EE specific patterns may also be used to assess pattern behavior for improvements. For example, tradeoffs inherent to the enterprise application design may lead to alternative design solutions.

In one embodiment, frameworks may be identified to help enhance the application design in 528. Frameworks may include implementation of the same functionality by multiple application components in different places. Generic frameworks, for example logging and error handling, may surface reusable logic in the application design. Since frameworks may be referenced by various application components, identifying and centralizing the frameworks may reduce the amount of implemented code and thus, code maintenance. Centralizing common functionality into a set of frameworks may allow application developers to concentrate on new features required by the application and to help simplify the development process. During design or redesign, common components may be factored into common modules as a framework of reusable components. A framework may incorporate shared utility components or frequently used business logic.

For example, organizing errors of an application into a framework helps different application components re-use error messages for the same type of exceptions. FIG. 8A illustrates a simple segmentation of errors into different categories. One way the errors may be subdivided is based on the error type. For instance, system related errors or database errors might be organized and handled differently from application errors resulting from the user input. Based on the type of errors, application modules may decide to record errors and in some cases send notification to the corresponding party. A new logging API, instead of various error handling routines in every module, may be incorporated into the design to allow developers to select a distribution channel. With the new logging API in FIG. 8B, developers can select a distribution channel such as the Java console, a log file, or a database. Additionally, the logging libraries may provide a way to format logs into an XML document if necessary. Designing an effective error handling mechanism may help the overall application organization and may contribute towards code reusability.

In another example, FIG. 9A is a sequence diagram depicting the flow of events in the process of obtaining a database connection. A Data Access framework may be used to improve the overall design. The purpose of the Data Access framework may be to support application wide access to various data stores the application accesses or may potentially access in the future. A DataAccessFactory component is an abstract class and defines a generic API to obtain a corresponding factory such as a database, e.g., OraDataAccessFactory. The specific factory would then create a DataAccessObject called ProductDao. The DataAccessObject called ProductDao provides access to the desired data and facilitates application communication to the underlying persistent storage.

A concrete DataAccessObject, such as ProductDAO in FIG. 9B, may be based on a generic interface that defines primary methods of the data access component. The Product class defines a value object for a product of a given type. The Product class encapsulates the data structure of the Product component used by the application as in FIG. 9C. The class implementing the ProductDAO interface may provide access to the corresponding data source such as a concrete relational database and may be used by the main application.

Designing or redesigning the application to encompass data access functionality into a framework may improve application interoperability and manageability. The Data Access framework may provide a facade to the underlying data source, thus abstracting the implementation details from the application components. The actual implementation of the Data Access framework may be based on the Data Access Object pattern that outlines the mechanism to access the underlying data store. Depending on the component type and the underlying data source, several Data Access objects that access corresponding data sources such as a RDBMS or XML repository may be used.

Figure 10:
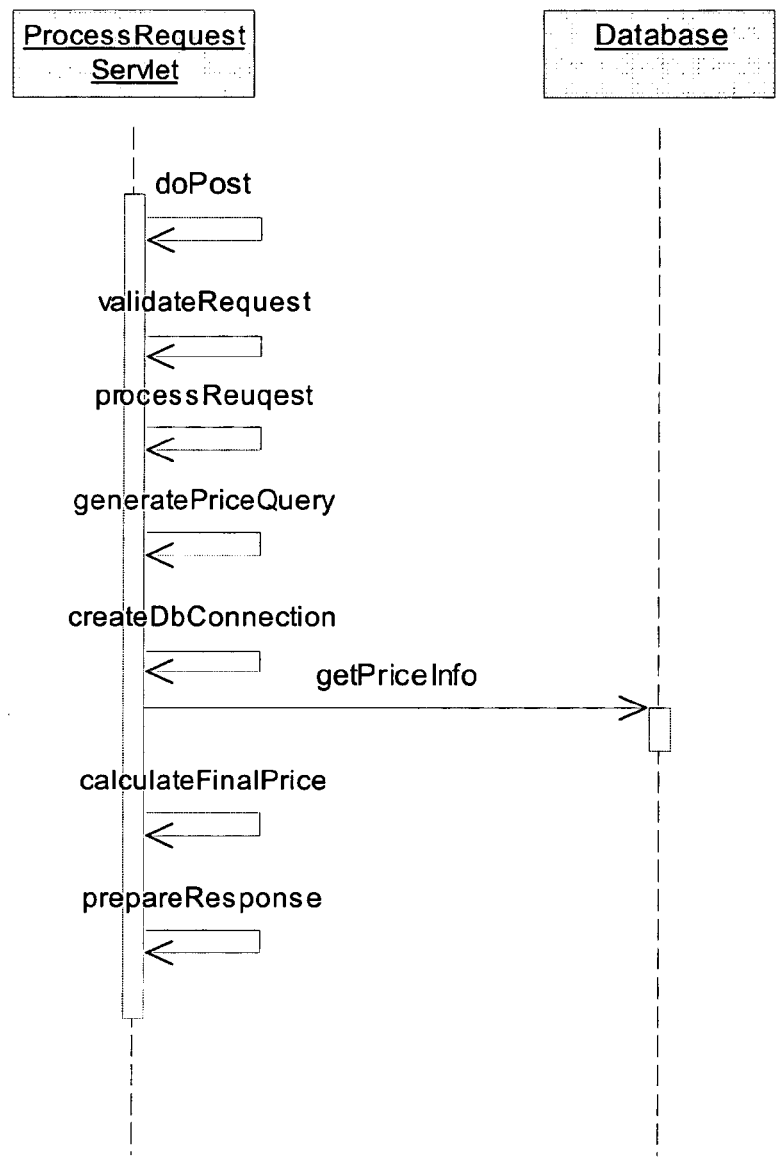
FIG. 10 illustrates application of refactoring according to one embodiment.
Figure 11:
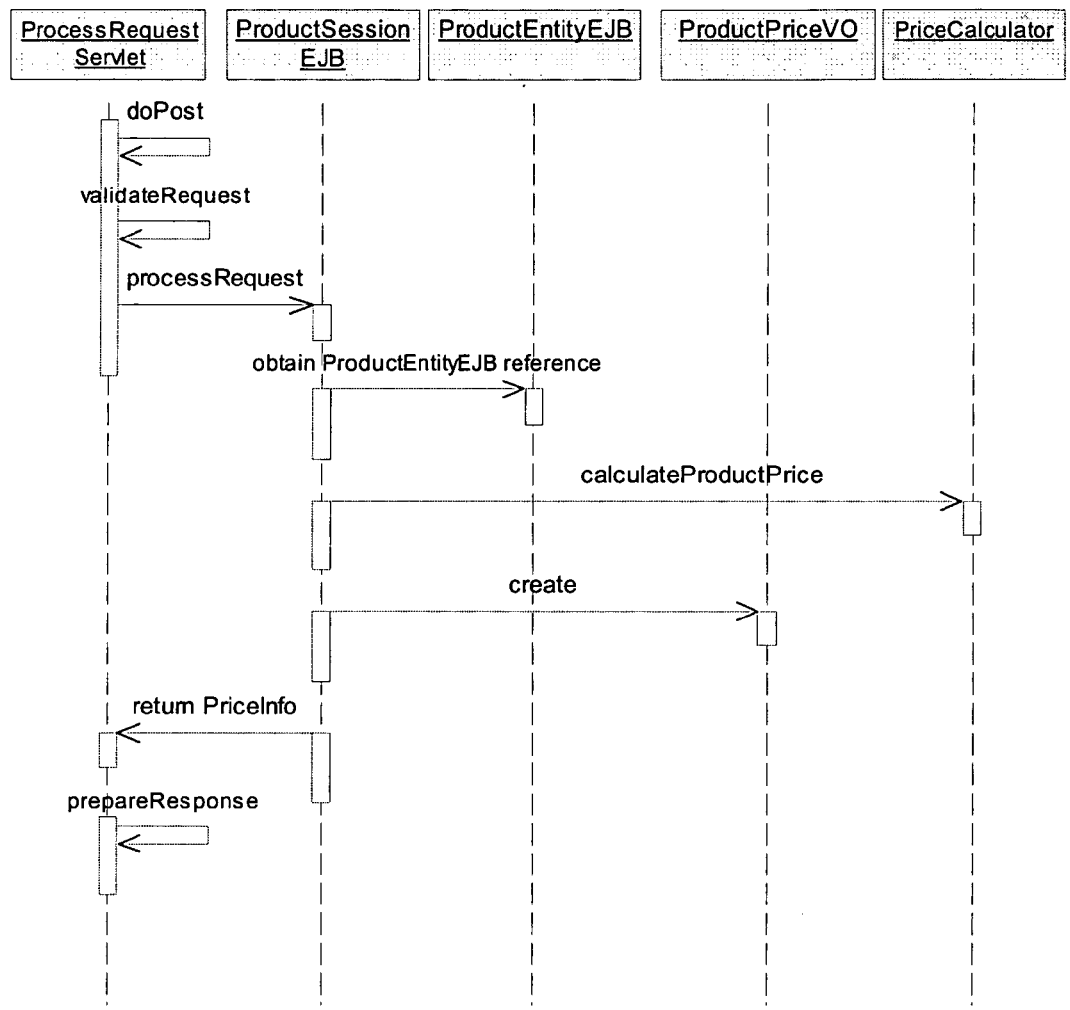
FIG. 11 illustrates application of refactoring according to one embodiment.

In one embodiment, refactoring may be applied during the code design or redesign in 530. Although refactoring may involve code changes to improve the internal structure, the observable behavior of the software may not change. Using refactoring techniques may help improve the overall application design, performance, and maintainability. For example, one application design pattern may be a single object implementing various types of functionality. A class may be designed to perform business related data manipulation, obtain a connection to the underlying data source, query the database, process the result set, and prepare the response to the user. Individual business logic for each business aspect may be factored out into separate helper components. For instance, a user request of the product price may be initially designed as illustrated in FIG. 10. By refactoring some of the functionality to the helper components, the main class such as ProcessRequestServlet might only be responsible for control of the execution flow. To enhance communication among various objects, it may be useful to apply the Model-View-Controller (MVC) paradigm. The improved design may be represented as in FIG. 11. In the latter scenario, the servlet may perform a controller role while the session bean helper object, e.g., ProductPrice, and other objects facilitate execution of the business flow. By refactoring some of the functionality to execute the business flow, the overall application design, performance, and maintainability may be improved.

Figures 12A, 12B:
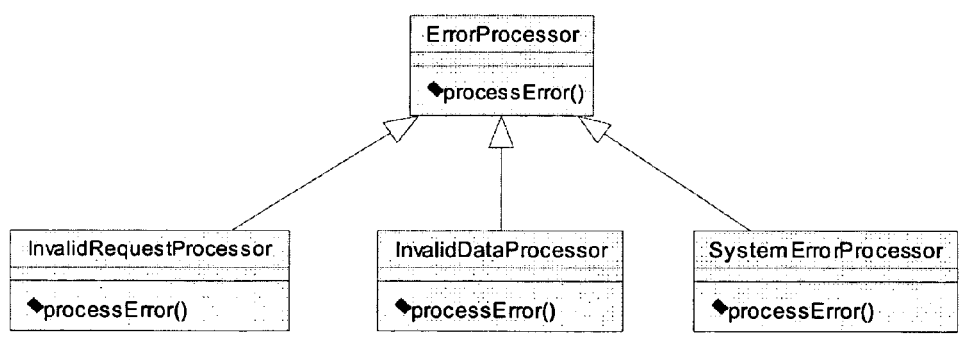
FIGS. 12A and 12B illustrate application of refactoring according to one embodiment.

An application method may contain excessive amounts of logic as illustrated in FIG. 12A. Leaving large conditional statements in the code may deteriorate application maintenance. Troubleshooting, extending, or changing existing functionality might become a difficult task. Refactoring out the content of the conditional statements into corresponding methods, or placing the excessive logic of the conditional statements into a subclass, may help improve design. Applying the Strategy (GoF) pattern to encapsulate behavior of the conditional statement into separate subclasses may reduce complexity and enhance application manageability. An alternative design of the process request is illustrated in FIG. 12B. By factoring out the conditional logic associated with an invalid request, an invalid data input, and a system error, the design may improve because the method complexity is reduced.

Turning again to FIG. 6, after the components within a tier have been designed or redesigned based on the component-level process, individual systemic qualities within the tier may be assessed as in 560. For example, the tier may be assessed based on availability, security, performance, and/or reliability factors. Note the list of systemic qualities is potentially infinite. In one embodiment, systemic qualities may be grouped and assessed by levels based on the category of quality. For example, availability and reliability may be considered in the design or redesign in the service level and interoperability and scalability may be considered in the design or redesign in the system level. Modifications may be made to the application design to help achieve various systemic qualities.

The application design or redesign may yield either a series of tactical and strategic recommendations for code creation or code enhancements in 580. The recommendations may include specific application enhancements based on design patterns, refactoring techniques, and frameworks. The recommendations may include specific code design to be incorporated. In one embodiment, the recommendations may include results for guiding the design or redesign phase. Tactical and strategic mechanisms for enhancing systemic qualities, or various categories of systemic qualities, may be depicted in an orthogonal view against the logical and physical representations. For example, the mechanisms may highlight the impact of a design or code change to a systemic quality within a layer or tier. An enterprise application may be designed or redesigned according to the recommendations.

After the components within a tier have been designed or redesigned based on the component-level process, individual systemic qualities within the tier have been assessed, and recommendations have been created, the design or redesign process may be repeated for any additional tiers as in 600.

Figure 13:
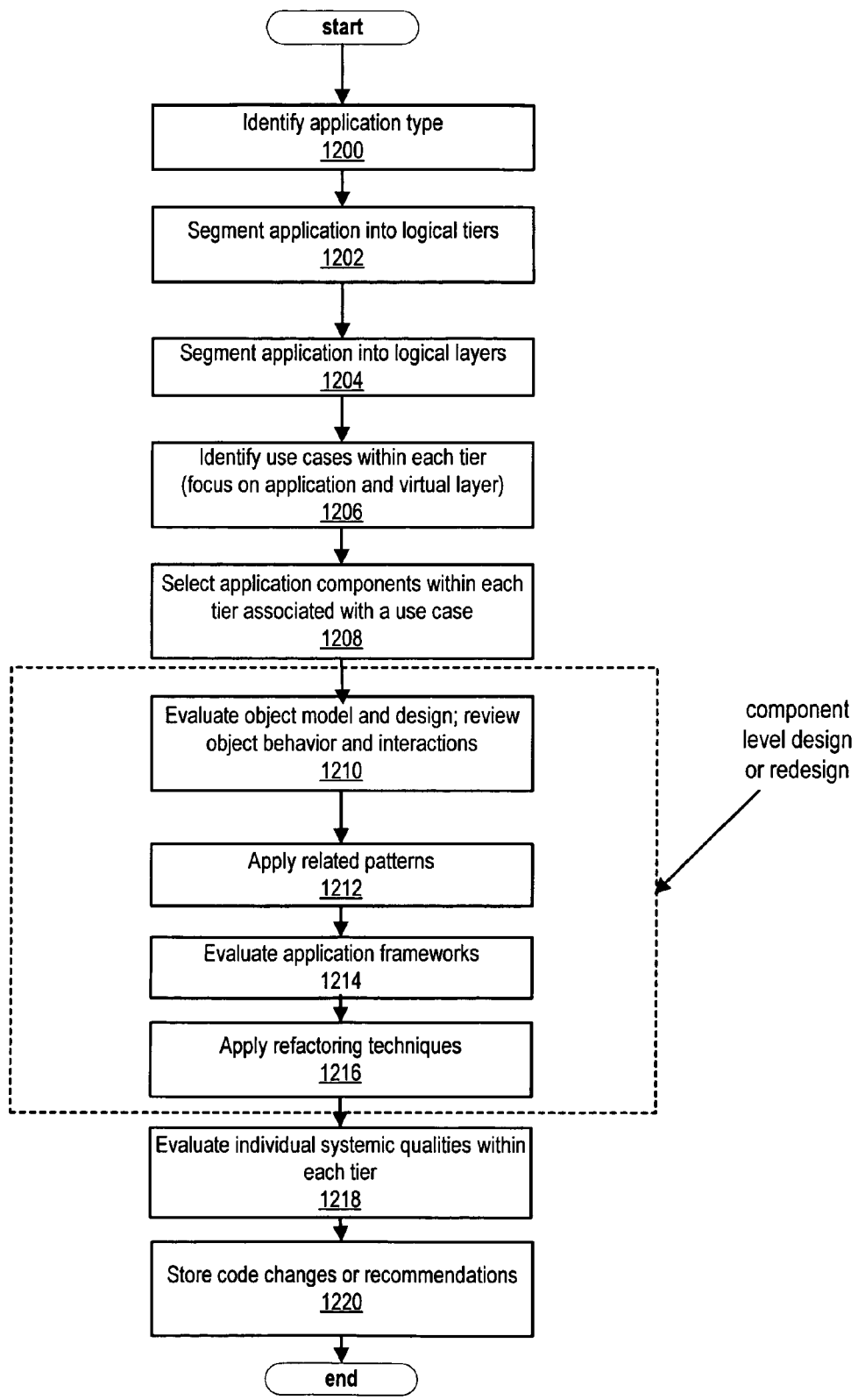
FIG. 13 illustrates a high-level design or redesign process according to one embodiment.

To further illustrate an example of the design or redesign of an enterprise application, FIG. 13 illustrates a high-level view of the process according to one embodiment. The design or redesign begins with the identification of the application type in 1200. The enterprise application type may determine the partitioning of the enterprise components across multiple tiers, or some other logical or physical representation. The application type may lead to other organizations and representations of tiers.

Once the application type is identified, the application may be segmented into logical or physical representations such as tiers as in 1202. Depending on the application type, tiers may be the logical or physical organization of components into an ordered chain of service providers and consumers. Components within a tier typically consume the services of those in an adjacent provider tier and provide services to one or more adjacent consumer tiers. Examples of tiers are client, presentation, business, integration, and resources.

In one embodiment, the application may be segmented into logical or physical representations such as layers as in 1204. Depending on the application type, layers may include the hardware and software stack that hosts services within a given tier. While tiers may represent processing chains across components, layers may represent component relationships in implementation and deployment of services. Examples of layers are application, upper, virtual, lower, and hardware layers.

Once the application type is identified, and the application is segmented into logical tiers and layers, architecturally significant use case scenarios at the application/virtual layer may be identified as in 1206. In one embodiment, the design or redesign may focus heavily on the component relationships at the code level. Use cases are functional scenarios that describe the flow of an operation from the perspective of an actor.

Once the application is segmented, and architecturally significant use case scenarios have been identified, the components within each tier associated with a use case may be selected as in 1208. For one embodiment, a component-level code design or redesign of each tier associated with specific use cases is performed at the application/virtual layers may be performed as in 1210 to 1216. Specific design mechanisms may be applied to each component. While assessing individual application components, the application object model and the individual object design may be closely analyzed for coding issues in 1210. During construction or reconstruction of code, the design or redesign process may surface issues with functionality incorrectly mapped to the object model or too much unrelated logic in the object design. As the implementation of the system functionality typically involves an interaction among multiple components, the design or redesign may include analysis of object interaction, the application APIs, and selected algorithms utilized by the various components. For example, the object design may satisfy requirements individually; however, once the object interacts with another object, the design may actually produce unexpected results. The cause for the unexpected results may be due to an object which inherited the wrong behavior, and thus inherited the wrong characteristics or features.

Enterprise application patterns may surface improvements during design or redesign in 1212. Patterns convey a mechanism for solving common problems encountered in enterprise applications. In one embodiment, J2EE specific patterns may be used to assess pattern behavior for improvements. For example, tradeoffs inherent to the enterprise application design may lead to alternative design solutions.

In one embodiment, frameworks may be identified to help enhance the application design in 1214. Frameworks may include implementation of the same functionality by multiple application components in different places. Since frameworks may be referenced by various application components, identifying and centralizing the frameworks may reduce the amount of implemented code and thus, code maintenance. Centralizing common functionality into a set of frameworks might allow application developers to concentrate on new features required by the application and to help simplify the development process. During design or redesign, common components may be factored into common modules as a framework of reusable components. A framework may incorporate shared utility components or frequently used business logic.

In one embodiment, refactoring may be applied during the code design or redesign in 1216. Although refactoring may involve code changes to improve the internal structure, the observable behavior of the software does not change. Using refactoring techniques may help improve the overall application design, performance, and maintainability. For example, one application design pattern may be a single object implementing various types of functionality. A class may be designed to perform business related data manipulation, obtain a connection to the underlying data source, query the database, process the result set, and prepare the response to the user. Individual business logic for each business aspect may be factored out into separate helper components.

After the components within a tier have been designed or redesigned based on the component-level process, individual systemic qualities within the tier may be assessed as in 1218. For example, the tier may be assessed based on availability, security, performance, and reliability factors. Note the list of systemic qualities is potentially infinite. In one embodiment, systemic qualities may be grouped and assessed by levels based on the category of quality. For example, availability and reliability may be considered in the design or redesign in the service level and interoperability and scalability may be considered in the design or redesign in the system level. Modifications may be made to the application design to help achieve various systemic qualities.

The application design or redesign may yield either a series of tactical and strategic recommendations for code creation or code improvements in 1220. The recommendations may include specific application enhancements based on design patterns, refactoring techniques, and frameworks. The recommendations may include specific code the design should incorporate. In one embodiment, the recommendations may include results for guiding the design or redesign phase. In one embodiment, the recommendations may be tier based. For example, the design or redesign concludes with recommendations from a component-level, use case, tier level view.

Note that the flow charts described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. Note also that the flow charts described herein do not necessary require a temporal order. It is intended that the following claims be interpreted to embrace all such modifications and changes and, accordingly, the specifications and drawings are to be regarded in an illustrative rather than a restrictive sense.

Various embodiments may further include receiving, sending or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

What is claimed is:

1. A method for constructing an enterprise application, comprising:
   partitioning an enterprise application into a plurality of tiers;
   identifying a use case for the enterprise application; and
   for each of a plurality of the tiers of the enterprise application, constructing a plurality of application layer code components to implement the use case, wherein for each of a plurality of the application layer code components, said constructing comprises:
      determining at a component-level an applicable pattern for implementing the component in the tier for the use case;
      constructing the component according to the applicable pattern; and
      storing the component on a tangible computer accessible medium.

2. The method as recited in claim 1, further comprising identifying other use cases for the enterprise application and repeating said constructing for each use case.

3. The method as recited in claim 1, wherein said pattern comprises a J2EE pattern.

4. The method as recited in claim 1, wherein said constructing further comprises constructing one or more of the components within one or more application frameworks.

5. The method as recited in claim 4, wherein the application framework comprises a logging and error handling framework.

6. The method as recited in claim 1, wherein said constructing further comprises refactoring common functionality for a plurality of the application layer code components into a separate reusable component.

7. The method as recited in claim 1, further comprising structuring each tier of the enterprise application for one or more systemic qualities.

8. The method as recited in claim 7, wherein the one or more systemic qualities include one or more of security, scalability, performance, availability and reliability.

9. The method as recited in claim 1, wherein said plurality of tiers include one or more of a client tier, a presentation tier, a business tier, an integration tier and a resource tier.

10. A method for constructing an enterprise application, comprising:
    partitioning an enterprise application into a plurality of tiers;
    identifying a use case for the enterprise application; and
    for each of a plurality of the tiers of the enterprise application, constructing a plurality of application layer code components to implement the use case, wherein for each of a plurality of the application layer code components, said constructing comprises:
       determining at a component-level an applicable application framework within which to implement the component in the tier for the use case;
       constructing the component within the applicable application framework; and
       storing the component on a tangible computer accessible medium.

11. The method as recited in claim 10, further comprising identifying other use cases for the enterprise application and repeating said constructing for each use case.

12. The method as recited in claim 10, wherein the application framework comprises a logging and error handling framework.

13. The method as recited in claim 10, wherein said constructing further comprises constructing one or more of the components according to a pattern.

14. The method as recited in claim 13, wherein said pattern comprises a J2EE pattern.

15. The method as recited in claim 10, wherein said constructing further comprises refactoring common functionality for a plurality of the application layer code components into a separate reusable component.

16. The method as recited in claim 10, further comprising structuring each tier of the enterprise application for one or more systemic qualities.

17. The method as recited in claim 16, wherein the one or more systemic qualities include one or more of security, scalability, performance, availability and reliability.

18. The method as recited in claim 10, wherein said plurality of tiers include one or more of a client tier, a presentation tier, a business tier, an integration tier and a resource tier.

19. A method for constructing an enterprise application, comprising:
    partitioning an enterprise application into a plurality of tiers;
    identifying a use case for the enterprise application; and
    for each of a plurality of the tiers of the enterprise application, constructing a plurality of application layer code components to implement the use case, wherein said constructing comprises:
       refactoring common functionality at a component-level for a plurality of the application layer code components into a separate reusable component;
       for each of a plurality of the application layer code components:
          constructing the component according to said refactoring; and
          storing the component on a tangible computer accessible medium.

20. The method as recited in claim 19, further comprising identifying other use cases for the enterprise application and repeating said constructing for each use case.

21. The method as recited in claim 19, wherein one or more of the code components is constructed according to a pattern.

22. The method as recited in claim 21, wherein said pattern comprises a J2EE pattern.

23. The method as recited in claim 19, wherein said constructing further comprises constructing one or more of the components within one or more application frameworks.

24. The method as recited in claim 23, wherein the application framework comprises a logging and error handling framework.

25. The method as recited in claim 19, further comprising structuring each tier of the enterprise application for one or more systemic qualities.

26. The method as recited in claim 25, wherein the one or more systemic qualities include one or more of security, scalability, performance, availability and reliability.

27. The method as recited in claim 19, wherein said plurality of tiers include one or more of a client tier, a presentation tier, a business tier, an integration tier and a resource tier.

28. A method for restructuring an enterprise application, comprising:
partitioning the enterprise application into a plurality of tiers;
identifying a use case for the enterprise application; and
restructuring one or more application layer code components for one or more of the tiers of the enterprise application to implement the use case, wherein one or more of the application layer code components is restructured according to one or more of: a pattern, a framework and refactoring;
wherein said one or more of a pattern, a framework and refactoring is determined according to a component-level analysis for the use case at one of said tiers;
wherein the one or more application layer code components are stored on a tangible computer accessible medium.

29. The method as recited in claim 28, further comprising identifying other use cases for the enterprise application and repeating said restructuring for each use case.

30. The method as recited in claim 28, wherein said pattern comprises a J2EE pattern.

31. The method as recited in claim 28, wherein the application framework comprises a logging and error handling framework.

32. The method as recited in claim 28, wherein said restructuring further comprises refactoring common functionality for a plurality of the application layer code components into a separate reusable component.

33. The method as recited in claim 28, further comprising restructuring each tier of the enterprise application for one or more systemic qualities.

34. The method as recited in claim 33, wherein the one or more systemic qualities include one or more of security, scalability, performance, availability and reliability.

35. The method as recited in claim 28, wherein said plurality of tiers include one or more of a client tier, a presentation tier, a business tier, an integration tier and a resource tier.

36. A tangible computer accessible medium comprising program instructions configured to implement an application layer of an enterprise application, wherein the program instructions are constructed by:
partitioning the enterprise application into a plurality of tiers;
identifying a use case for the enterprise application; and
structuring one or more application layer code components for one of the plurality of tiers of the enterprise application to implement the use case, wherein one or more of the code components is structured according to one or more of: a pattern, a framework and refactoring;
wherein said one or more of a pattern, a framework and refactoring is determined according to a component-level analysis for the use case.

37. The computer accessible medium as recited in claim 36, wherein the program instructions are additionally constructed by identifying other use cases for the enterprise application and repeating said structuring for each use case.

38. The computer accessible medium as recited in claim 36, wherein said pattern comprises a J2EE pattern.

39. The computer accessible medium as recited in claim 36, wherein the application framework comprises a logging and error handling framework.

40. The computer accessible medium as recited in claim 36, wherein said structuring further comprises refactoring common functionality for a plurality of the application layer code components into a separate reusable component.

41. The computer accessible medium as recited in claim 36, wherein the program instructions are additionally constructed by structuring the tier of the enterprise application for one or more systemic qualities.

42. The computer accessible medium as recited in claim 41, wherein the one or more systemic qualities include one or more of security, scalability, performance, availability and reliability.

43. The computer accessible medium as recited in claim 36, wherein said plurality of tiers include one or more of a client tier, a presentation tier, a business tier, an integration tier and a resource tier.

44. A system, comprising:
a processor;
a memory operable to store program instructions executable by the processor to implement an application layer of an enterprise application, wherein the program instructions comprise:
one or more code components for one of a plurality of tiers of the enterprise application to implement a use case, wherein the one or more code components is structured according to one or more of: a pattern, a framework and refactoring; wherein said one or more of a pattern, a framework and refactoring is determined according to a component-level analysis for the use case.

45. The system as recited in claim 44, wherein the program instructions further comprise one or more other code components for the one of the plurality of tiers of the enterprise application to implement other use cases, wherein the one or more other code components is structured according to one or more of: a pattern, a framework and refactoring.

46. The system as recited in claim 44, wherein said pattern comprises a J2EE pattern.

47. The system as recited in claim 44, wherein the application framework comprises a logging and error handling framework.

48. The system as recited in claim 44, wherein said refactoring comprises including common functionality for a plurality of the application layer code components into a separate reusable component.

49. The system as recited in claim 44, wherein the one or more code components are structured for one or more systemic qualities for the one of the plurality of tiers of the enterprise application.

50. The system as recited in claim 44, wherein the one or more systemic qualities include one or more of security, scalability, performance, availability and reliability.

51. The system as recited in claim 44, wherein said plurality of tiers include one or more of a client tier, a presentation tier, a business tier, an integration tier and a resource tier.

* * * * *